(12) United States Patent
Juan

(10) Patent No.: US 9,735,837 B2
(45) Date of Patent: Aug. 15, 2017

(54) METHOD AND WIRELESS CHARGING RECEIVER CAPABLE OF AUTOMATICALLY DETECTING INFORMATION OF WIRELESS POWER TRANSMITTER TO LIMIT MAXIMUM CHARGING CURRENT PROVIDED FOR PORTABLE DEVICE

(71) Applicant: MEDIATEK INC., Hsin-Chu (TW)

(72) Inventor: Kuan-Kai Juan, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/139,349

(22) Filed: Apr. 27, 2016

(65) Prior Publication Data
US 2017/0126280 A1    May 4, 2017

Related U.S. Application Data

(60) Provisional application No. 62/250,711, filed on Nov. 4, 2015.

(51) Int. Cl.
*H04B 5/00*    (2006.01)
*H04B 1/3883*    (2015.01)

(52) U.S. Cl.
CPC .......... *H04B 5/0037* (2013.01); *H04B 1/3883* (2013.01)

(58) Field of Classification Search
CPC .......... H02J 7/0073; H02J 7/025; H02J 7/007; H02J 7/0052
See application file for complete search history.

(56) References Cited

U.S. PATENT DOCUMENTS

| | | | |
|---|---|---|---|
| 9,407,107 B2* | 8/2016 | Park | H02J 7/007 |
| 2011/0298297 A1 | 12/2011 | van Wageningen | |
| 2012/0194124 A1* | 8/2012 | Toivola | H02J 7/025 320/108 |
| 2013/0062959 A1* | 3/2013 | Lee | H04B 5/0031 307/104 |
| 2014/0159508 A1* | 6/2014 | Sankar | H02J 17/00 307/149 |
| 2015/0194838 A1 | 7/2015 | Won | |
| 2015/0288195 A1* | 10/2015 | Ashery | H02J 5/005 307/104 |

* cited by examiner

*Primary Examiner* — Tuan Pham
(74) *Attorney, Agent, or Firm* — Winston Hsu

(57) ABSTRACT

A method applied in a wireless charging receiver includes: dynamically detecting information of a wireless power transmitter which provides power for a portable device via the wireless charging receiver; and dynamically generating at least one power configuration signal on at least one signal path of a communication interface between the wireless charging receiver and the portable device according to the detected information of the wireless power transmitter, to limit a maximum charging current provided from the wireless charging receiver to the portable device at a specific charging current level.

12 Claims, 1 Drawing Sheet

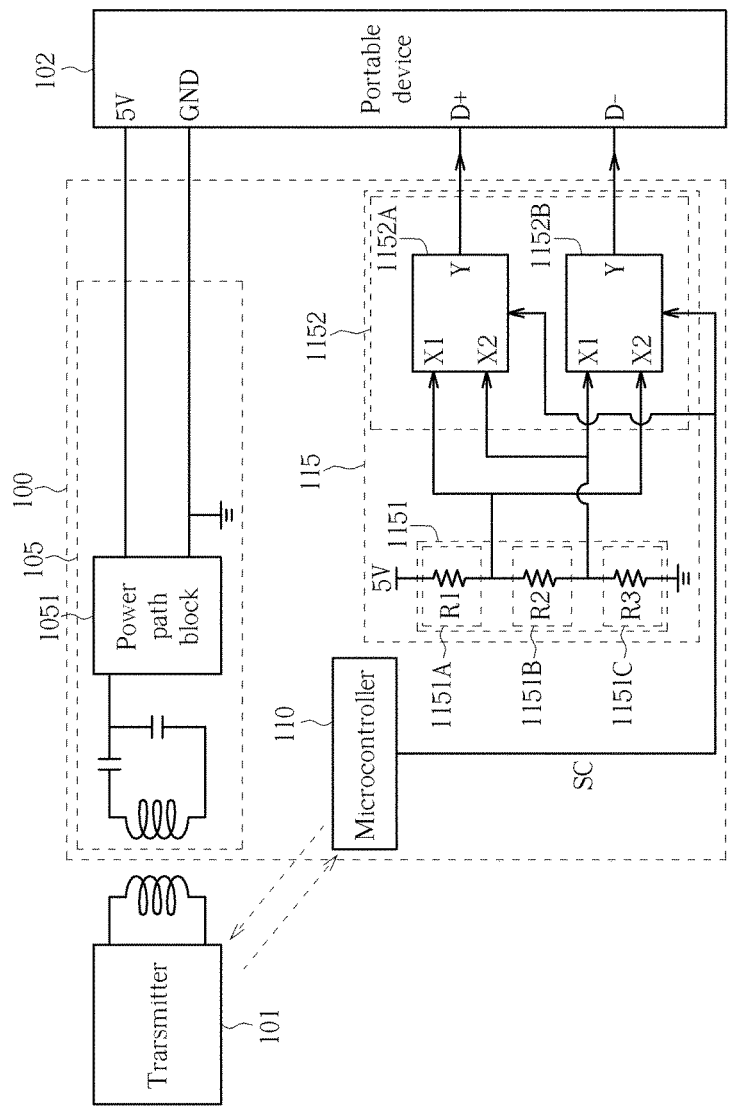

METHOD AND WIRELESS CHARGING RECEIVER CAPABLE OF AUTOMATICALLY DETECTING INFORMATION OF WIRELESS POWER TRANSMITTER TO LIMIT MAXIMUM CHARGING CURRENT PROVIDED FOR PORTABLE DEVICE

CROSS REFERENCE TO RELATED APPLICATIONS

This application claims priority of U.S. provisional application Ser. No. 62/250,711 filed on Nov. 4, 2015, which is entirely incorporated herein by reference.

BACKGROUND

The present invention relates to a wireless charging scheme, and more particularly to a wireless charging receiver and a method applied into the receiver.

Generally speaking, a conventional charging system between a wireless power transmitter and a conventional wireless power receiver can be used to transfer power wirelessly to a portable device. However, the conventional charging system inevitably collapses if the power level provided by the wireless power transmitter is not enough while the portable device draws a larger charging current from the conventional wireless power receiver.

SUMMARY

Therefore one of the objectives of the invention is to provide a method and wireless charging receiver capable of automatically detecting information of a wireless power transmitter to limit a maximum charging current provided for a portable device, to solve the above-mentioned problems.

According to an embodiment of the invention, a wireless charging receiver is disclosed. The receiver comprises a microcontroller and a setting circuit. The microcontroller is configured to dynamically detect information of a wireless power transmitter which provides power for a portable device via the wireless charging receiver. The setting circuit is coupled to the microcontroller and configured to dynamically generate at least one power configuration signal on at least one signal path of a communication interface between the wireless charging receiver and the portable device according to the detected information of the wireless power transmitter, to limit a maximum charging current provided from the wireless charging receiver to the portable device at a specific charging current level.

According to the embodiment, a method applied in the wireless charging receiver is further disclosed. The method comprises: dynamically detecting information of a wireless power transmitter which provides power for a portable device via the wireless charging receiver; and dynamically generating at least one power configuration signal on at least one signal path of a communication interface between the wireless charging receiver and the portable device according to the detected information of the wireless power transmitter, to limit a maximum charging current provided from the wireless charging receiver to the portable device at a specific charging current level.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGURE is a diagram showing a wireless charging receiver according to an embodiment of the invention.

DETAILED DESCRIPTION

Please refer to FIGURE, which is a diagram showing a wireless charging receiver 100 according to an embodiment of the invention. The wireless charging receiver 100 is capable of automatically/dynamically detecting information of a wireless power transmitter 101 and selecting an appropriate power confutation from multiple different power configurations to set an appropriate power confutation for a portable device 102 such as a smart phone device or a wearable electronic device without causing the charging system between transmitter 101 and receiver 100 collapse when the portable device 102 draws a charging current from the receiver 100 as far as possible. Equivalently, the receiver 100 is able to set different appropriate power confutations for portable device 102 to limit the maximum charging current provided from the receiver 100 to the portable device 102 at different current levels in response to different power transmitters. The receiver 100 can be applied in various kinds of wireless power standards such as Qi published by WPC (Wireless Power Consortium), PMA (Power Matters Alliance) standard, A4WP (Alliance for Wireless Power) standard, and so on.

It should be noted that a conventional charging system between a power transmitter and a conventional power receiver may collapse due to that the power level provided by the conventional power transmitter is not enough while a portable device tries to draw a larger current from the conventional power receiver. However, in this embodiment of the invention, the receiver 100 can select and configure different maximum charging currents for the portable device 102 according to different information of different power transmitters. For example, the receiver 100 is arranged to configure a smaller maximum output charging current for the portable device 102 when detecting/determining that the type of transmitter 101 or power level provided by transmitter 101 corresponds to a lower power level. Alternatively, the receiver 100 is arranged to configure a larger maximum output charging current for the portable device 102 when detecting/determining that the type of transmitter 101 or power level provided by transmitter 101 corresponds to a higher power level.

The information of wireless power transmitter 101 comprises type and/or transmitted power level of the wireless power transmitter 101. That is, the receiver 100 can sense and configure a maximum charging current for the portable device 102 based on the type or power level of the power transmitter 101. Additionally, the above-mentioned maximum output charging current indicates a maximum charging current that can be averagely provided by receiver 100 or a maximum charging current that can be instantaneously provided by receiver 100.

In practice, the receiver 100 comprises a power path circuit 105, a controller 110 such as a microcontroller, and a setting circuit 115. The power path circuit 105 is electrically coupled to the wireless power transmitter 101 and connected to the portable device 102 and is configured to transfer and deliver power provided by the wireless power transmitter 101 to the portable device 102. In practice, the power path circuit 105 includes a transformer coil and a power path block 1051, and is used to sense and transfer the power provided by the wireless power transmitter 101. The microcontroller 110 is coupled to the power path circuit 105 and configured to dynamically detect information of the wireless power transmitter 101 which provides power for the portable device 102 via the wireless charging receiver 100. For example, the microcontroller 110 can detect the type and/or transmitted power level provided by wireless power transmitter 101. The microcontroller 110 is then arranged to generate the control signal SC to control the setting circuit 115 according to the detected type and/or transmitted power level of wireless power transmitter 101.

The setting circuit 115 is coupled to the microcontroller 110 and configured to generate at least one power configuration signal on at least one signal path of a communication interface between the wireless charging receiver 100 and the portable device 102 according to the detected information of the wireless power transmitter, and thus a charging current provided for the portable device 102 can be limited at a specific charging current level according to the at least one power configuration signal. The communication interface can be a universal serial bus (USB) interface, and the at least one signal path can correspond to a positive data port D+ or negative data port D−. That is, the setting circuit 115 can inform the portable device 102 of the selected power configuration (i.e. the maximum charging current) by sending one power configuration signal on one of data ports D+ and D− or by sending two power configuration signals on data ports D+ and D−. Thus, the portable device 102 can know/detect how much current amount can be extracted from the receiver 100, and is arranged to draw an appropriate charging current from the receiver 100 based on the information carried by the power configuration signal(s). It should be noted that the USB interface is not meant to be a limitation of the invention. The operation of sending power configuration signal(s) on signal path(s) of a communication interface can be also applied into various kinds of communication interfaces.

Communication between portable device 102 and receiver 100 can be accomplished by sending a plurality of power configuration signals (e.g. a set of power configuration signals) on signal paths of the communication interface to inform portable device 102 of which power configuration is selected by receiver 100. For instance, if the portable device is an iOS-based device, the setting circuit 115 is arranged to generate a set of power configuration signals on data ports D+ and D− of the USB communication interface between the wireless charging receiver 100 and the portable device 102 according to the detected information of the wireless power transmitter 101. The set of power configuration signals transmitted on the data ports D+ and D− in this embodiment is a set of voltage level signals that are used to hold/keep the voltage levels of the data ports D+ and D− at corresponding levels so as to inform the portable device 102 of the power configuration selected by receiver 100. By detecting the voltage levels at the data ports D+ and D−, the portable device 102 can know/obtain which power configuration and corresponding output charging current are selected by receiver 100. An exemplary table showing a mapping between different output charging currents and corresponding voltage levels at data ports D+ and D− for iOS devices is shown below.

| Charging current | D+ voltage | D− voltage |
|---|---|---|
| 0.5 A | 2 V | 2 V |
| 1.0 A | 2 V | 2.7 V |
| 2.1 A | 2.7 V | 2 V |
| 2.4 A | 2.7 V | 2.7 V |

For example, when receiver 100 selects a lowest power configuration, the setting circuit 115 of receiver 100 is arranged to generate and output a set of voltage levels both corresponding to 2 Volts on data ports D+ and D− to hold/keep both the levels of D+ and D− at 2 Volts. The portable device 102 can detect that the receiver 100 in this situation is arranged to provide an output charging current of at most 0.5 A, and accordingly draws a charging current from receiver 100 based on the maximum charging current of 0.5 A. For example, the portable device 102 can draw a charging current of 0.5 A as far as possible.

When receiver 100 selects a low (or lower) power configuration, the setting circuit 115 of receiver 100 is arranged to generate and output a set of voltage levels including 2 Volts for data port D+ and 2.7 Volts for data port D− to hold/keep the levels of D+ and D− at 2 Volts and 2.7 Volts respectively. Thus portable device 102 can know/detect that the receiver 100 in this situation is arranged to provide an output charging current of at most 1.0 A, and accordingly draws a charging current from receiver 100 based on the maximum charging current of 1.0 A. For example, the portable device 102 can draw a charging current of 1.0 A as far as possible.

When receiver 100 selects a medium power configuration, the setting circuit 115 of receiver 100 is arranged to generate and output a set of voltage levels including 2.7 Volts for data port D+ and 2 Volts for data port D− to hold/keep the levels of D+ and D− at 2.7 Volts and 2 Volts respectively. Thus the portable device 102 can know/detect that the receiver 100 in this situation is arranged to provide an output charging current of at most 2.1 A, and accordingly draws a charging current from receiver 100 based on the maximum charging current of 2.1 A. For example, the portable device 102 can draw a charging current of 2.1 A as far as possible.

When receiver 100 selects a higher power configuration, the setting circuit 115 of receiver 100 is arranged to generate and output a set of voltage levels 2.7 Volts on data ports D+ and D− to hold/keep both the levels of D+ and D− at 2.7 Volts respectively. Thus the portable device 102 can know/detect that the receiver 100 in this situation is arranged to provide an output charging current of at most 2.4 A, and accordingly draws a charging current from receiver 100 based on the maximum charging current of 2.4 A. For example, the portable device 102 can draw a charging current of 2.4 A as far as possible.

It should be noted that the above examples of the mapping for different charging currents and voltage levels are used for illustrative purposes to explain how the receiver 100 communicate with portable device 102 via data ports D+/D− of the USB communication interface, and are not meant to be limitations of the invention. In other examples such as android devices, the receiver 100 is still able to communicate with the portable device 102 implemented by android device or other type devices by transmitting different power configuration signal(s) on data port(s) of the communication interface to inform the portable device 102.

Further, it should be noted that the receiver 100 is able to provide low power and/or medium power for the portable device 102 in response to different types of the transmitter 101. In practice, for generating low power configuration signals and/or medium power configuration signals in different situations, the setting circuit 115 comprises a voltage divider 1151 and a selection circuit 1152. The voltage divider 1151 comprises resistor elements 1151A-1151C connected in series between a supply voltage such 5 Volts and a ground level wherein the resistor elements 1151A-1151C respectively include resistances R1, R2, R3. Based on the resistances R1, R2, R3 and the voltage dividing structure, the voltage divider 1151 generates different voltage levels such as 2.7 Volts and 2 Volts as a first voltage signal V1 and a second voltage signal V2 shown in FIGURE, respectively. The selection circuit 1152 is coupled to the voltage divider 1151 and based on the control signal SC from the microcontroller 110 to select a power configuration so as to select one of the first voltage signal V1 and the second voltage signal V2 as a first power configuration signal outputted to a positive signal path of the communication interface (e.g. data port D+ of USB interface) and to select the other of the first voltage signal and the second voltage signal as a second power configuration signal outputted to a negative signal path of the communication interface (e.g. data port D− of USB interface). In practice, the selection circuit 1152 comprises two multiplexers 1152A and 1152B both receiving signals V1-V2 and controlled by the microcontroller 110.

For instance, the first voltage signal V1 is a voltage level of 2.7 Volts, and the second voltage signal V2 is a voltage level of 2 Volts. The multiplexer 1152A of selection circuit 1152 is arranged to receive signal V1 at its input port X1, receive signal V2 at its input port X2, and output an output a signal from its output port Y to the data port D+ as the first power configuration signal. The multiplexer 1152B of selection circuit 1152 is arranged to receive signal V1 at its input port X2, receive signal V2 at its input port X1, and to output an output a signal from its output port Y to the data port D− as the second power configuration signal. The microcontroller 110 is arranged to generate the control signal SC to the multiplexers 1152A-1152B to control the multiplexers 1152A-1152B.

When the microcontroller 110 detects/determines that the maximum/average/nominal power level provided by transmitter 101 is equal to or approximates to a low power such as 5 W, the microcontroller 110 is arranged to generate and output the control signal SC including a first logic level such as low logic level to multiplexers 1152A-1152B. Based on the low logic level, the multiplexer 1152A selects the signal V2 (i.e. 2 Volts) from signals V1 and V2 as its output, and the multiplexer 1152B selects the signal V1 (i.e. 2.7 Volts) from signals V1 and V2 as its output. Accordingly, voltage levels at data ports D+ and D− are kept at 2 Volts and 2.7 Volts, respectively. This informs the portable device 102 of the selected power configuration indicating that the maximum output charging current provided for portable device 102 is configured as 1.0 A.

When the microcontroller 110 detects/determines that the maximum/average/nominal power level provided by transmitter 101 is equal to or approximates to a medium power such as a range of 5-15 W, the microcontroller 110 is arranged to generate and output the control signal SC including a second logic level such as high logic level to multiplexers 1152A-1152B. Based on the high logic level, the multiplexer 1152A selects the signal V1 (i.e. 2.7 Volts) from signals V1 and V2 as its output, and the multiplexer 1152B selects the signal V2 (i.e. 2 Volts) from signals V1 and V2 as its output. Accordingly, voltage levels at data ports D+ and D− are kept at 2.7 Volts and 2 Volts, respectively. This informs the portable device 102 of the selected power configuration indicating that the maximum output charging current provided for portable device 102 is configured as 2.1 A.

Further, the microcontroller 110 can be arranged to control the power path circuit 105 to perform a current limit operation according to the detected information of the wireless power transmitter 101. For example, the output charging current provided for the portable device 102 can be configured as a maximum charging current corresponding to medium power even though the receiver 100 may detect that power transmitter 101 only transmits low power. The current limit operation is arranged to limit the maximum current provided for the portable device 102 as the specific current such as 1.0 A corresponding to low power. Thus, even though the power transmitter 101 only transmits the low power, the power transfer system between transmitter 101 and receiver 100 will not collapse. The operation and function of current limit is optional and is not meant to be a limitation of the invention.

Additionally, the microcontroller 110 can be implemented within a single integrated circuit such as a chip or system on chip (SOC), and the setting circuit 115 can be externally connected to the single integrated circuit. Alternatively, the microcontroller 110 and setting circuit 115 can be implemented within the same single integrated circuit. The modifications obey the spirit of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A wireless charging receiver, comprising:
a controller, configured to dynamically detect information of a wireless power transmitter which provides power for a portable device via the wireless charging receiver; and
a setting circuit, coupled to the controller, configured to dynamically generate at least one power configuration signal on at least one signal path of a communication interface between the wireless charging receiver and the portable device according to the detected information of the wireless power transmitter, to limit a maximum charging current provided from the wireless charging receiver to the portable device at a specific charging current level;
wherein the setting circuit is arranged to select a power configuration among a plurality of power configurations according to the detected information of the wireless power transmitter, and to generate the at least one power configuration signal on the at least one signal path of a communication interface between the wireless charging receiver and the portable device based on the selected power configuration; the maximum charging current provided from the wireless charging receiver corresponds to the selected power configuration; and, the setting circuit comprises:
a voltage divider, configured to generate a first voltage signal and a second voltage signal different from the first voltage signal; and
a selection circuit, coupled to the voltage divider, configured to selecting one of the first voltage signal and the second voltage signal as a first power configuration signal outputted to a positive signal path of the communication interface according to the selected power configuration, and selecting the other of the first voltage signal and the second voltage signal as a second power configuration signal outputted to a negative signal path of the communication interface according to the selected power configuration;

wherein the maximum charging current provided from the wireless charging receiver corresponds to the first power configuration signal and the second power configuration signal.

2. The wireless charging receiver of claim 1, wherein the controller is arranged to detect at least one of a type and an output power level of the wireless power transmitter.

3. The wireless charging receiver of claim 1, wherein the setting circuit is arranged to generate a set of power configuration signal on data ports D+ and D− of the communication interface between the wireless charging receiver and the portable device according to the detected information of the wireless power transmitter.

4. The wireless charging receiver of claim 1, wherein the setting circuit selects a low power configuration when the detected information of the wireless power transmitter corresponds to low power; and, the setting circuit selects a medium power configuration when the detected information of the wireless power transmitter corresponds to medium power.

5. The wireless charging receiver of claim 1, further comprising:
a power path circuit, electrically coupled to the wireless power transmitter and connected to the portable device, configured to transfer and deliver power provided by the wireless power transmitter to the portable device;
wherein the controller is arranged to control the power path circuit to perform a current limit operation according to the detected information of the wireless power transmitter.

6. The wireless charging receiver of claim 1, wherein the controller is implemented within an integrated circuit, and the setting circuit is externally connected to the integrated circuit.

7. The wireless charging receiver of claim 1, wherein the controller and the setting circuit are implemented within the same integrated circuit.

8. A method applied in a wireless charging receiver, comprising:
dynamically detecting information of a wireless power transmitter which provides power for a portable device via the wireless charging receiver; and
dynamically generating at least one power configuration signal on at least one signal path of a communication interface between the wireless charging receiver and the portable device according to the detected information of the wireless power transmitter, to limit a maximum charging current provided from the wireless charging receiver to the portable device at a specific charging current level;
wherein the step of dynamically generating the at least one power configuration signal on the at least one signal path of the communication interface between the wireless charging receiver and the portable device according to the detected information of the wireless power transmitter comprises:
selecting a power configuration among a plurality of power configurations according to the detected information of the wireless power transmitter; and
generating the at least one power configuration signal on the at least one signal path of a communication interface between the wireless charging receiver and the portable device based on the selected power configuration, to limit a maximum charging current provided from the wireless charging receiver to the portable device at a specific charging current level;
wherein the step of generating the at least one power configuration signal on the at least one signal path of the communication interface between the wireless charging receiver and the portable device based on the selected power configuration comprises:
generating a first voltage signal and a second voltage signal different from the first voltage signal;
selecting one of the first voltage signal and the second voltage signal as a first power configuration signal outputted to a positive signal path of the communication interface according to the selected power configuration; and
selecting the other of the first voltage signal and the second voltage signal as a second power configuration signal outputted to a negative signal path of the communication interface according to the selected power configuration.

9. The method of claim 8, wherein the step of dynamically detecting information of the wireless power transmitter comprises:
detecting at least one of a type and an output power level of the wireless power transmitter.

10. The method of claim 8, wherein the step of dynamically generating the at least one power configuration signal on the at least one signal path of the communication interface between the wireless charging receiver and the portable device according to the detected information of the wireless power transmitter comprises:
generating a set of power configuration signal on data ports D+ and D− of the communication interface between the wireless charging receiver and the portable device according to the detected information of the wireless power transmitter.

11. The method of claim 8, wherein the step of selecting a power configuration among a plurality of power configurations according to the detected information of the wireless power transmitter comprises:
selecting a low power configuration when the detected information of the wireless power transmitter corresponds to low power; and
selecting a medium power configuration when the detected information of the wireless power transmitter corresponds to medium power.

12. The method of claim 8, further comprising:
controlling a power path circuit of the wireless charging receiver to perform a current limit operation according to the detected information of the wireless power transmitter.

* * * * *